(12) United States Patent
Niemelä

(10) Patent No.: US 6,430,399 B1
(45) Date of Patent: Aug. 6, 2002

(54) MULTIPATH TRANSMISSION FOR OPTIMIZING RECEIVER RECEPTION

(75) Inventor: Kari Niemelä, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,688

(22) PCT Filed: Aug. 19, 1998

(86) PCT No.: PCT/FI98/00639

§ 371 (c)(1),
(2), (4) Date: Mar. 30, 1999

(87) PCT Pub. No.: WO99/09677

PCT Pub. Date: Feb. 25, 1999

(30) Foreign Application Priority Data

Aug. 20, 1997 (FI) .................................................. 973422

(51) Int. Cl.[7] .............................................. H04B 1/58
(52) U.S. Cl. ............................ 455/67.6; 455/69; 455/65
(58) Field of Search ............................... 455/62.1, 63.3, 455/63.6, 561, 63, 65, 68, 69

(56) References Cited

U.S. PATENT DOCUMENTS

| | | | |
|---|---|---|---|
| 5,481,569 A | | 1/1996 | Conti et al. |
| 5,615,409 A | * | 3/1997 | Forssen et al. .............. 455/562 |
| 5,745,858 A | * | 4/1998 | Sato et al. ..................... 455/63 |
| 6,101,399 A | * | 8/2000 | Raleigh et al. .............. 455/561 |
| 6,115,464 A | * | 9/2000 | Lester et al. .................. 455/65 |
| 6,154,661 A | * | 11/2000 | Goldburg ..................... 455/562 |

FOREIGN PATENT DOCUMENTS

| | | |
|---|---|---|
| WO | WO 94/01939 | 1/1994 |
| WO | WO 97/23064 | 6/1997 |

OTHER PUBLICATIONS

Copy of International Search Report for PCT/FI98/00639.

* cited by examiner

Primary Examiner—Lee Nguyen
Assistant Examiner—Philip J. Sobutka
(74) Attorney, Agent, or Firm—Altera Law Group, LLC

(57) ABSTRACT

The invention relates to a transmission method and a radio system comprising a transmitter and a receiver that communicate with each other by means of signals they have transmitted. The signals propagate along different paths from the transmitter to the receiver, which comprises means for combining the signals that have propagated along different paths after the reception. The radio system comprises transmitting means for transmitting for each connection at least two signals that are combined in the means into one signal, and measuring means for measuring the combined signal and for estimating the optimality of the transmission. The radio system also comprises control means that adjust, on the basis of the measurement and estimation, the phase of at least the signal that is to be transmitted in the downlink direction in the signal transmission by the transmitting means in order to decrease accumulation of signals during the combining of the signals.

31 Claims, 2 Drawing Sheets

MULTIPATH TRANSMISSION FOR OPTIMIZING RECEIVER RECEPTION

FIELD OF THE INVENTION

The invention relates to a transmission method used in a radio system comprising a transmitter and a receiver, which method comprises transmitting signals by means of which a connection is set up between the transmitter and the receiver and which propagate along different paths to the receiver, and in which method the signals that have propagated along different paths are combined in the receiver after the signals have been received.

BACKGROUND OF THE INVENTION

Cellular radio systems generally employ different diversity methods to improve the quality of a connection between a base station and a subscriber terminal under varying conditions. The base station can transmit a signal to the subscriber terminal in the downlink direction by means of several different antennas. Diversity combining decreases particularly the disadvantages caused by signal fading. In diversity methods, information contained in preferably several received signals that do not correlate with one another is combined. In multipath reception, the most common diversity receivers combine the signals before or after the detection. Multipath signals are usually detected for example by Viterbi detection.

Connection quality between a base station and a subscriber terminal usually depends on, for example, the speed at which the subscriber terminal moves and the distance between the transmitting antennas. Another factor affecting the connection quality is for example obstacles on the radio path that reflect the signal, thus causing a delay therein.

The receiver arrangement generally used in radio systems is a so-called RAKE receiver that consists of one or several RAKE branches. Each branch is an independent receiver unit the function of which is to compose and demodulate one received signal component. Each branch can be synchronized with a signal component that has propagated along an individual path. In a conventional receiver, the signals from the receiver branches are combined to obtain a signal with good quality. However, combining of signals does not always provide the best possible signal. In some cases, the signal components forming the sum signal are received at a stage where summing of the signals deteriorates the signal capacity.

In known radio systems, downlink antenna beams of a base station are directed on the basis of a signal a subscriber terminal has transmitted to the base station. Such a downlink beam steering method is called a DOA (Direction of Arrival) method. The beam steering is carried out on the basis of a signal transmitted by a subscriber terminal to a base station, even though the uplink and downlink signals do not have the same frequency, which means that the steering is not accurate. Since the downlink and the uplink direction are not identical in practice, phase calibration is required between TX and RX parts of a base station. If several antennas are used simultaneously for signal transmission, the summed antenna beam of the antennas will have a very strip-like shape, which causes problems especially in signal reception. An antenna beam that is common to several transmitting antennas also contains shadow areas, which cause problems on a connection between the base station and a subscriber terminal.

BRIEF DESCRIPTION OF THE INVENTION

The object of the present invention is to provide a transmission method and a radio system with which the aforementioned problems can be solved.

This is obtained with a transmission method of the type described in the introduction, characterized in that at least two signals are transmitted for each connection and the signals are combined in the receiver into a signal that forms the connection and that is measured, and in which method the optimality of the phase of the transmitted signal is estimated and the phase of at least the signal transmitted in the downlink direction is adjusted on the basis of the measurement and estimation.

The invention also relates to a radio system comprising a transmitter and a receiver that communicate with each other by means of signals they have transmitted, which signals propagate along different paths from the transmitter to the receiver, which comprises means for combining the signals that have propagated along different paths after the reception.

The radio system according to the invention is characterized in that the radio system comprises transmitting means for transmitting for each connection at least two signals that are combined in the means into one signal, measuring means for measuring the combined signal and for estimating the optimality of the transmission, and control means that adjust, on the basis of the measurement and estimation, the phase of at least the signal that is transmitted in the downlink direction during the signal transmission by the transmitting means in order to decrease the accumulation of signals during the combining of the signals.

The preferred embodiments of the invention are disclosed in the dependent claims.

The invention is based on the idea that the antenna beam of the transmitter is changed on the basis of data received from measurement of the signals received by the receiver, so that the receiver can receive an optimal signal.

The transmission method and the radio system according to the invention provide several advantages. By means of the method, signals received by the receiver are adjusted on the basis of measurement reports provided by the receiver. The adjustment can be carried out rather slowly, if necessary. The method can improve the performance in the downlink direction by about 3 to 8 dB, depending on the situation. The adjustment is also executed adaptively, such that the performance in the downlink direction does not decrease below the performance of a non-combined signal, which is possible in conventional methods. Since the antenna beam of the transmitter is directed on the basis of a signal received by the receiver, the receiver receives an optimal signal. By means of the method, even a mobile subscriber terminal can receive a signal of good quality that is adapted to the subscriber terminal.

BRIEF DESCRIPTION OF THE DRAWINGS

The invention will be described in greater detail in connection with the preferred embodiments and with reference to the accompanying drawings, in which.

DETAILED DESCRIPTION OF THE INVENTION

Figure 1:
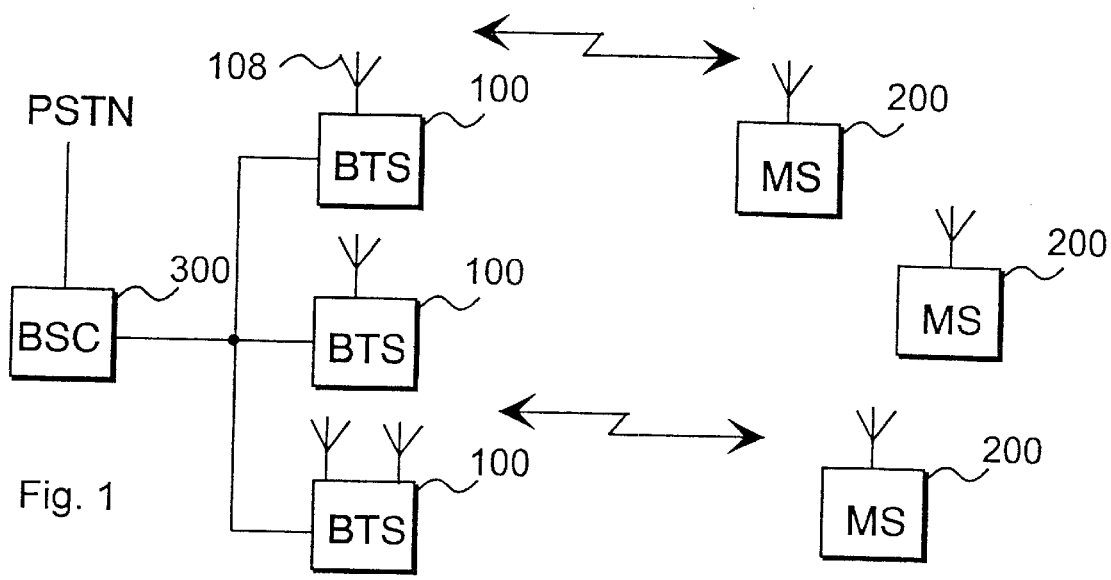
FIG. 1 shows a radio system utilizing the method according to the invention.

FIG. 1 shows a radio system comprising transmitters 100, receivers 200 and a base station controller 300. In the example of the figure, the transmitters are assumed to be base stations and the receivers are assumed to be subscriber terminals. However, in practice both the base stations and the subscriber terminals act as transceivers. The base station controller 300 communicates with the transmitters 100 and it controls the operation thereof. In the arrangement shown in the figure, the base station controller communicates with a PSTN. The transmitter comprises one or several antennas 108. The antenna beam of the antenna 108 forms an area in the radio system where the receiver 200 can receive a signal transmitted by the transmitter 100.

Figure 2:
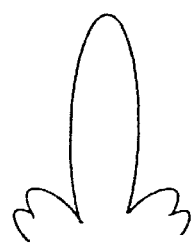
FIG. 2 shows an antenna beam formed by an antenna.

FIG. 2 shows an antenna beam or directivity pattern formed by the antenna 108. The antenna beam comprises a main beam that is directed towards the desired primary coverage area of the transmitter. In a normal situation, the signal strength in the coverage area is such that it is possible to establish a connection to the receiver. Since radio systems are liable to signal fading, for example, the transmitter can transmit, by utilizing several antennas 108, signals with which the transmitter 100 is able to form a better connection to the receiver 200.

Figure 3:
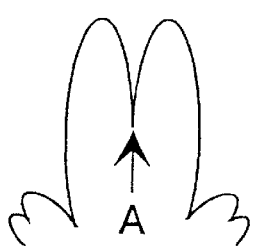
FIG. 3 shows an antenna beam formed by two antennas.
Figure 4:
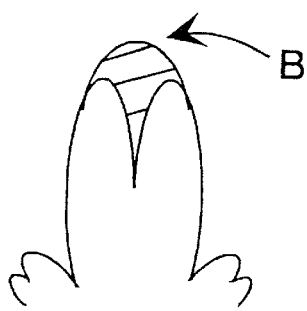
FIG. 4 shows a shadow area of an antenna beam formed by two antennas.

FIG. 3 shows an antenna beam formed by two antennas used in signal transmission. Point A of the antenna beam clearly comprises a minimum point. The minimum point is a result of accumulation of the signals. FIG. 4 shows an antenna beam comprising a shadow area that is a result of the minimum point and that is denoted by B. In the shadow area, the signal strength may be insufficient for setting up a connection between the transmitter 100 and the receiver 200. Even if a connection could be set up, it may be discontinuous.

Figure 5:
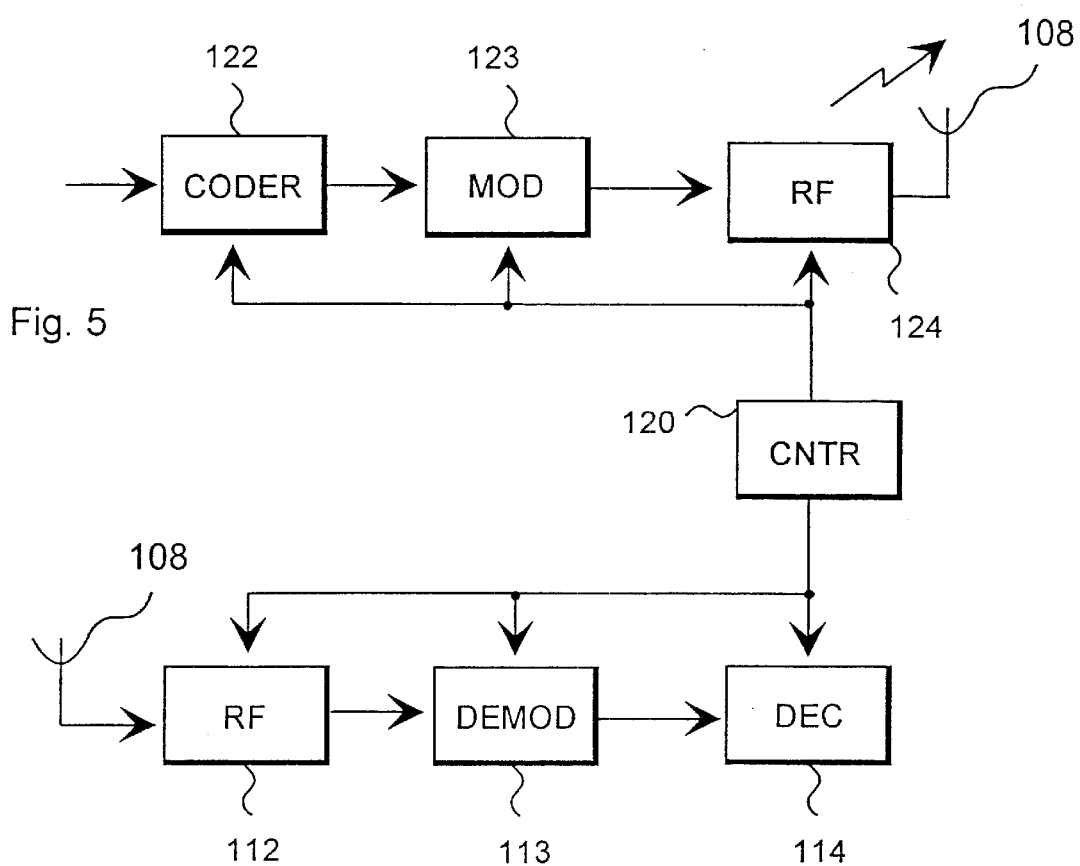
FIG. 5 shows a basic structure of a transceiver.

FIG. 5 shows a basic structure of a transmitter 100 and a receiver 200 used in the radio system. More specifically, the figure shows a base station that operates as a transceiver. The transceiver comprises an antenna 108, radio-frequency parts 112, a demodulator 113 and a decoder 114. The transceiver also comprises a coder 122, a modulator 123 and radio-frequency parts 124. The subscriber terminal 100 also comprises control means 102 that control that operation of the aforementioned parts. In practice, the antenna 108 shown in the figure operates as both a transmitting and a receiving antenna.

The radio-frequency parts 112 of the transceiver transfer a radio-frequency analogue signal supplied from the antenna 108 into an intermediate frequency and filter the signal. The radio-frequency parts 112 also detect the intermediate-frequency signal. The demodulator 113 may restore a broadband signal into a narrow-band data signal. The data signal is decoded with the decoder 114 in a suitable manner. The decoder 114 decodes a signal that has typically been subjected to convolutional coding. The operation of the decoder 114 may be based for example on the Viterbi algorithm. The decoder 114 usually also descrambles and deinterleaves the pre-treated signal. If the transceiver were a subscriber terminal, the signal would be supplied from the decoder 114 for example to a headphone.

The coder 122 can subject the signal it has received to convolutional coding and scrambling. The coder 122 also interleaves the bits or bit sequences of the signal. The signal that has been subjected to convolutional coding can also be subjected to pseudo-noise coding into a broadband spread spectrum signal in the modulator 123. The spread spectrum signal is thereafter converted into a radio-frequency signal according to known methods in the radio-frequency parts 124 and transmitted via the antenna 108 to the radio path. If the transceiver were a subscriber terminal, the coder 122 would receive an audio signal from a microphone.

Figure 6:
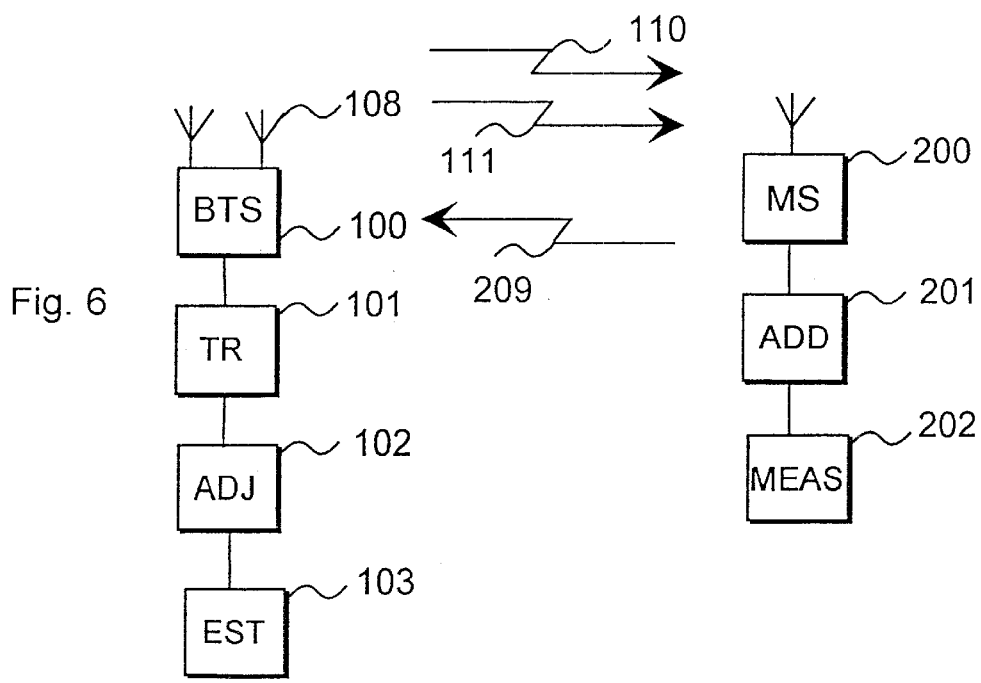
FIG. 6 shows, in greater detail, a radio system according to the invention.

FIG. 6 shows a radio system utilizing the method according to the invention. In addition to the transmitter 100, the radio system comprises transmitting means 101 and control means 102. The aforementioned means 101 and 102 are connected to the transmitter or the base station 100 in the arrangement shown in the figure. In practice, the means 101, 102 are situated at the base station. The radio system also comprises a receiver 200, means 201 and measuring means 202. The means 201 and 202 are connected to the receiver 200 in the arrangement shown in the figure. In practice, these means 201, 202 are situated at the receiver 200.

In the arrangement shown in the figure, the transmitting means 101 transmit signals to the receiver 200. The transmitter 100 communicates with the receiver 200 through signals 110, 111 transmitted by the transmitting means 101. Each signal is transmitted with a different antenna. In practice, the signals propagate along different paths from the transmitter 100 to the receiver 200 since there are usually different obstacles on the radio path and the signals are reflected from these obstacles. Reflections are due to for example high buildings. The signals that have propagated along different paths are combined in the means 201. Combining of the signals enables for example the formation of a signal with better quality. If there is a sufficient phase difference between the signals received by the receiver 200, the signals accumulate in the combining. The accumulation of the signals decreases the signal strength.

The control means 102 adjust the phase of the signals before they are transmitted by the transmitting means 101, so that the signals can be combined without accumulation. In addition to the phase, the control means 102 can also adjust the amplitude and delay of the signal to be transmitted so that the accumulation of the signals can be decreased further.

The adjustment of the signal by the control means 102 often reduces especially the minimum points that occur in an antenna beam formed by several antennas 108. At best, the adjustment may prevent the occurrence of minimum points entirely, which in turn improves the communication between the transmitter and the receiver within the coverage area of the transmitter. The adjustment decreases and prevents the occurrence of shadow areas. The adjustment enables the propagation of at least one signal to be transmitted in the downlink direction such that the receiver 200 is able to receive a signal that is sufficiently strong. The adjustment also has an adaptive effect, which means that the receiver can receive a signal which is approximately 3 to 8 dB stronger than a single signal. In practice, the control means 102 are situated in the modulator 123 of the transmitter. The control means may also be situated in the intermediate-frequency or radio-frequency parts 124.

The measuring means 202 estimate and measure the received signal. The estimation is carried out for example by means of measurement of the BER, the signal-to-noise ratio or the signal level. The measuring means 202 measure the signal during a predetermined measuring period. During the measuring period, the control means 102 are prevented from adjusting the signal, which means that the control parameters of the signal to be measured are kept constant. The length of the measuring period is for example 480 ms. The measuring period is usually transmitted once during a multiframe on an SACCH. After the measurement, the receiver 200 transmits the result of the measurement to the transmitter 100 via a signal 209. The control means 102 adjust the signals 110, 111 to be transmitted on the basis of the measurement carried out by the measuring means 202.

The radio system comprises estimating means 103 for evaluating the reliability of the estimation. This can be carried out such that the means 103 compare the data obtained from the estimation to a signal received by the transmitter 100 from the receiver 200. The optimality of the phase used in the transmission is estimated by transmitting a signal activating the measurement to the measuring means 202. The transmitting means 101 transmit some of the signals with a phase that is selected randomly. The transmitting means 101 also transmit some of the signals with a predetermined phase. The measuring means 202 thereafter compare the qualities of the signals transmitted in different manners.

The control means 102 do not necessarily have to adjust all the signals to be transmitted. The control means 102 adjust for example only one signal. The control means 102 change the phase of preferably at least one signal with a predetermined phase shift. The control means 102 also change the phase of at least one signal with a random phase shift. The control means 102 may change the signal phase randomly, when the strength of the combined signal remains below a predetermined threshold value. The control means 102 adjust randomly the phase of other channels than a TCH, in particular. In the situation described above, the control means 102 adjust the delay to such a level that the phase difference of the signals to be transmitted covers 360°. A randomly changing phase and delay can also be used on a TCH especially when no suitable phase difference is found for the signals to be transmitted during the adaptation stage.

The transmitting means 101 transmit most of the signals with a phase with which the receiver 200 forms a signal with substantially the least accumulation. The transmitting means 101 transmit the signals to be combined preferably without correlation, which means that the formation of minimum points in the directivity pattern can be decreased. If there is no delay difference between the signals and only the phase of the signals is changed, the signals can correlate at least over a short span of time. The control means 102 adjust the signal phase occasionally, and therefore it is possible to locate the optimal phase for transmitting a signal. However, the transmitting means 101 transmit only a small part of the signals with a phase that is used to find an even more optimal phase.

The signals transmitted by the transmitting means 101 may consist of bursts, for example. In such a case, the control means 102 adjust each burst separately. It is possible to define for the control means 102 a burst-specific phase that is adjusted when the transmit power of the transmitting means 101 in the transmitter is substantially at a minimum. The adjustment is preferably carried out when the transmit power of the transmitter has been switched off completely, so that it is possible to avoid the formation of transients. The transmission method according to the invention is applicable for use especially in SDMA (Space Division Multiple Access) and CDMA methods. The quality of the received signals is improved further when the method according to the invention is used with known error correction algorithms.

When the transmitter 100 and the receiver 200 have set up a connection, the control means 102 change the phase of one or several bursts, which is intended to test the optimality of the phase used. The phase of other bursts than those mentioned above is changed with a random phase. Preferably seven bursts out of eight are kept at the same phase and one burst is used for testing the optimality of the phase used in this burst. The phase to be tested is kept constant for the duration of at least one measuring period during which the measuring means 103 estimate the signal.

When all the phases have been tested, the receiver transmits to the transmitter data about the phase providing the signal with the best quality to the receiver 200. The data is transmitted by means of the signal 209. The control means 102 start then using the phase determined on the basis of the measurement. If a phase providing the receiver with a minimum signal is located first, it can be assumed that the optimal signal can be located 180° from the phase providing the minimum signal. The optimal phase can therefore be determined by locating either the minimum or the maximum point in the strength of a signal received by the receiver.

When the control means 102 use the optimal phase, most of the bursts are transmitted with the same phase and only some of the bursts are used for testing. However, at this point it is not necessary to go through all the phases. It is sufficient to concentrate on the phases that are likely to provide the best connection. If the receiver moves rapidly or the transmitted signal is reflected several times, the control means 102 change the signal phase randomly. In this situation, it is also possible to use correlation estimates which have been estimated from the uplink direction and on the basis of which it is possible to estimate correlation in the downlink direction as well.

The more reliably the best signal phase used in the transmission is determined in the method, the greater the part of the signals transmitted with this phase by the transmitting means 101. The optimality of the phase used is estimated by transmitting the measuring period of the receiver with a random phase and the next measuring period with a fixed phase. Next, the qualities of the signals received by the receiver are compared. If there is a great difference in quality between the received signals, correspondingly the phase estimate used is also better. The more uncertain the estimate of the correct phase is, the more the control means 102 change the phase.

In the transmission method according to the invention, it is possible to use an adaptive time division ratio. Depending on the situation, the number of signals or bursts transmitted to the optimal phase angle is changed on the basis of the reliability of the phase determination. Some of the bursts are used for testing aimed at locating an optimal phase. The number of bursts used for the testing is so small that the testing does not interfere with the connection. The number of signals and bursts is changed on the basis of the reliability of the selected phase, such that when the selected phase is very reliable, most of the signals are transmitted with the selected phase. A table illustrating possible distribution of interleaved signals or bursts is shown below.

| Reliability of decision | bursts with random phase | bursts with the best phase | bursts for testing |
|---|---|---|---|
| 0 (no data) | 7 | 0 | 1 |
| 1 (uncertain) | 5 | 2 | 1 |
| 2 (rather certain) | 2 | 5 | 1 |
| 3 (certain, and poor S/N) | 0 | 5 | 2 |
| 4 (certain, and good S/N) | 0 | 7 | 1 |

If no data about the reliability of a decision formed on the basis of the uplink direction is available, seven bursts out of eight are transmitted with a random phase and one burst is used for testing. When the selected phase is most likely the correct one and the signal-to-noise ratio of the signal is sufficiently high, seven bursts out of eight are transmitted with the selected phase and one burst is used for testing.

Even though the invention is described above with reference to the examples according to the accompanying drawings, it is clear that the invention is not restricted thereto but it can be modified in several ways within the scope of the inventive idea disclosed in the appended claims.

What is claimed is:

1. A transmission method used in a radio system including a transmitter and a receiver, which method comprising:

transmitting signals by a connection set up between a transmitter and a receiver, wherein the signals propagate along different paths to the receiver, and combining the signals that have propagated along the different paths in the receiver after the signals have been received, wherein at least two signals are transmitted for the connection and the signals are combined in the receiver into a single signal, the single signal being measured during a predetermined measuring period, and the optimality of the phase used in the transmission is estimated by transmitting a signal activating a measurement by the receiver, such that some of the signals are transmitted with a randomly selected phase and some of the signals are transmitted with a predetermined phase, wherein the qualities of the signals received by the receiver are compared, and the phase of at least one of the signals transmitted in a downlink direction is adjusted on the basis of the measurement and estimation.

2. The method according to claim 1, wherein the signals are transmitted with their own antennas, which produce a common antenna beam that contains minimum points of the signal strength, and a phase adjustment increases a signal strength in these minimum points.

3. The method according to claim 1, wherein the signals are transmitted with their own antennas, which form a common antenna beam to which a signal is transmitted, wherein a phase adjustment enables the propagation of at least one of the signals in the downlink direction so that it is possible to receive a signal in the area of the common antenna beam.

4. The method according to claim 1, wherein in addition to the phase, a signal amplitude and delay are also adjusted.

5. The method according to claim 1, wherein a signal received by the receiver is measured, data about the measured signal is sent to the transmitter, the optimality of the transmission is estimated on the basis of the measurement, and a signal to be transmitted is adjusted on the basis of the data obtained from the estimation.

6. The method according to claim 1, wherein the reliability of the estimation is evaluated such that the estimated values are compared to a signal received by the transmitter from the receiver.

7. The method according to claim 1, wherein the quality of the received signal is measured for example by a BER, a signal-to-noise ratio or a signal level, and the signal to be transmitted is adjusted on the basis of data obtained from the measurement.

8. The method according to claim 1, wherein the phase of at least one signal is adjusted after the connection has been set up.

9. The method according to claim 1, wherein the phase used in the adjustment is determined after the connection set-up, wherein the phase of at least one signal is changed with a predetermined phase shift and the phase of at least one signal is changed with a random phase shift.

10. The method according to claim 1, wherein the signals received by the receiver are measured during a predetermined measuring period when signal control parameters are kept constant.

11. The method according to claim 1, wherein in the combining of the transmission signals, if there is a sufficient phase difference between the signals received by the receiver, the signals accumulate in the combining, wherein the accumulation of the signals decreases the signal strength.

12. The method according to claim 1, wherein during the adjustment, a signal phase is changed randomly when the strength of the combined signals remain below a predetermined threshold value.

13. The method according to claim 1, wherein, when a signal consists of bursts, each burst is adjusted separately.

14. The method according to claim 1, wherein, when a signal consists of bursts, the phase of at least one burst is adjusted to test the optimality of the phase used in said burst.

15. The method according to claim 1, wherein the signals are adjusted when the transmit power of the transmitter is at a minimum.

16. A radio system comprising:

a transmitter and a receiver that communicate with each other by signals they have transmitted, which signals propagate along different paths from the transmitter to the receiver, combining means for combining the signals that have propagated along the different paths after reception, transmitting means for transmitting for a connection at least two signals that are combined in the combining means into one signal, measuring means for measuring the combined signal and for estimating the optimality of the transmission, wherein on the basis of the estimation, the transmitting means transmit a signal activating a measurement to the measuring means, wherein some of the signals are transmitted with a randomly selected phase and some of the signals are transmitted with a predetermined phase, wherein the measuring means compare the quality of the signals received by the receiver, and control means that adjust, on the basis of the measurement and an estimation, the phase of at least a signal that is transmitted in a downlink direction during signal transmission by the transmitting means in order to decrease an accumulation of signals during the combining of the signals.

17. The radio system according to claim 16, wherein the radio system comprises several antennas, and the transmitting means transmit each signal with a separate antenna.

18. The radio system according to claim 16, wherein the radio system comprises several antennas, and the antennas produce a common antenna beam comprising minimum points of signal strength, and the control means increase the signal strength in these minimum points.

19. The radio system according to claim 16, wherein in addition to the phase, the control means adjust an amplitude and a delay of a signal to be transmitted.

20. The radio system according to claim 16, wherein the radio system comprises estimating means for transmitting data about the measured signal to the control means, which adjust the signal to be transmitted to the receiver on the basis of the data obtained from the estimation.

21. The radio system according to claim 16, wherein the radio system comprises estimating means for evaluating the reliability of the estimation, such that the means compare data obtained from the estimation to a signal received by the transmitter from the receiver.

22. The radio system according to claim 21, wherein the estimating means estimate the quality of a signal received by the receiver on the basis of measurement of a BER, a signal-to-noise ratio or a signal level carried out by the measuring means.

23. The radio system according to claim 16, wherein the control means change the phase of at least one signal after the connection has been set up.

24. The radio system according to claim 16, wherein the control means change the phase of at least one signal with a predetermined phase shift and the phase of at least one signal with a random phase shift.

25. The radio system according to claim 16, wherein the measuring means measure the signal received by the receiver during a predetermined measuring period during which the control means are prevented from adjusting the signal, keeping control parameters of the signal to be measured constant.

26. The radio system according to claim 16, wherein in the combining means for combining the signals, if there is a sufficient phase difference between the signals received by the receiver, the signals accumulate in the combining means, wherein the accumulation of the signals decreases the signal strength.

27. The radio system according to claim 16, wherein the control means change the signal phase randomly when the strength of the combined signal remains below a predetermined threshold value.

28. The radio system according to claim 16, wherein, when a signal transmitted by the transmitting means consists of bursts, the control means adjust each burst separately.

29. The radio system according to claim 16, wherein, when a signal transmitted by the transmitting means consists of bursts, the control means adjust the phase of at least one burst to test the optimality of the phase used.

30. The radio system according to claim 16, wherein the control means adjust the signal when the transmit power of the transmitter is at a minimum.

31. The radio system according to claim 16, wherein the transmitter is a base station and the receiver is a subscriber terminal.

* * * * *